United States Patent [19]

Samuelsson

[11] Patent Number: 5,453,839
[45] Date of Patent: Sep. 26, 1995

[54] OPTOELECTRONIC MEASURING SCALE

[76] Inventor: Jonas Samuelsson, RusthÅllaregatan 7, 702 20 Örebro, Sweden

[21] Appl. No.: 140,107
[22] PCT Filed: Apr. 23, 1992
[86] PCT No.: PCT/SE92/00265
  § 371 Date: Nov. 14, 1994
  § 102(e) Date: Nov. 14, 1994
[87] PCT Pub. No.: WO92/19931
  PCT Pub. Date: Nov. 12, 1992

[30] Foreign Application Priority Data

Apr. 30, 1991 [SE] Sweden ............................ 9101302

[51] Int. Cl.⁶ ................................................ G01B 11/14
[52] U.S. Cl. ........................ 356/375; 250/237 G; 33/707
[58] Field of Search ................................ 356/372, 373, 356/375, 121, 122, 123, 399–401, 138, 152, 153, 144, 374; 250/561, 237 G; 33/706, 707, 1 N, 1 L, 1 PT

[56] References Cited

U.S. PATENT DOCUMENTS

| | | | |
|---|---|---|---|
| 3,100,846 | 8/1963 | Burkhardt | 356/375 |
| 3,369,444 | 2/1968 | Patrignani | 356/373 |
| 3,865,492 | 2/1975 | Butler | 356/153 |
| 4,135,086 | 1/1979 | Baba | 250/237 G |
| 4,490,608 | 12/1984 | Yeadon et al. | 250/237 G |
| 4,898,464 | 2/1990 | Thorne et al. | 356/150 |

*Primary Examiner*—Hoa Q. Pham
*Attorney, Agent, or Firm*—Hayes, Soloway, Hennessey, Grossman, & Hage

[57] ABSTRACT

An optoelectronic measuring scale for determining and indicating position of light emitted from a beam source is provided. The measuring scale comprises a composite unit including a profiled body, a number of discrete photoelements fixedly mounted on a circuit board or similar device in the body and connected to a microprocessor attached to the circuit board. Mounted in the measuring scale is a diffusor for distributing incident light such that the intensity of such incident will be distributed over a plurality of mutually adjacent photoelements. The microprocessor detects and compares the intensity of light detected by respective photoelements and, based on the intensity of light detected by the photoelements, produces output currents for causing the exact position of the light beam to be indicated on a display connected to the scale.

4 Claims, 2 Drawing Sheets

OPTOELECTRONIC MEASURING SCALE

BACKGROUND OF THE INVENTION

FIELD OF THE INVENTION

The present invention pertains to a measuring instrument, and more particularly relates to an optoelectronic measuring scale which is constructed to determine and to indicate the exact position at which a beam of light emitted from a radiation source, for instance a laser projector, impinges thereon through a window or an opening.

BRIEF DESCRIPTION OF RELATED PRIOR ART

When detecting optical radiation, it is normal to use light detecting components generally in the form of semiconductors. Optoelectronic integrated circuits are used in the form of detector matrices equipped with so-called CCD-devices. Such devices (charge coupled devices) are normally very small (10–15μm) and despite the fact that each separate matrix may include a large number of elements, about 2,000 elements, the total geometric extension of such a matrix is relatively short. Matrices which comprise charge coupled devices cannot therefore be used for measuring scales of relatively long lengths. This would require the matrices to be disposed in mutually sequential rows, but since the matrices are not equipped with CCD-devices right out to their extremities, the detection gaps between the matrices would reduce the detecting ability of such a linear measuring scale.

Neither is it possible to use matrices that are equipped with other forms of integrated circuits, since these would render the construction of remaining electronics in the measuring scale far too complicated for the intended purpose.

SUMMARY OF THE INVENTION

The object of the present invention is to provide an optoelectronic measuring scale of relatively short extension, about 0.5 meters, and the invention is mainly characterized, to this end, in that the measuring scale includes a row of discrete photoelements firmly mounted on a circuit board or the like and connected conductively to a microprocessor attached to the circuit board; in that firmly mounted in the measuring-scale is a diffuser which functions to distribute radiation intensity of incident light in the measuring scale over a plurality of mutually adjacent photoelements; and in that the microprocessor functions to compare the intensity of the light emitted by respective photoelements and, subsequent to calculating the center-of-gravity of the broadened intensity curve, to produce signals which cause the exact position of the light beam on the measuring scale to be displayed on a display device connected to said scale.

The use of a diffusor in the beam path of the measuring scale is justified because the light beam emitted, for instance, by a laser projector has a small beam divergence and a small degree of intensity distribution. The pitch or spacing of the photoelements mounted on a circuit board in the measuring scale is greater than the intensity distribution of the light beam. With a diffusor placed in the beam path of the measuring scale, the radiation intensity of the light beam is distributed in a manner such that a plurality of mutually adjacent photoelements will be irradiated within the measuring scale and therewith deliver output currents that are proportional to the degree of illumination or irradiation.

DESCRIPTION OF THE DRAWING

Other characteristic features of the invention are evident from the following description and claims. The invention will now be described in more detail with reference to exemplifying embodiments thereof and also with reference to the accompanying drawings, in which

DETAILED DESCRIPTION OF THE PREFERRED EMBODIMENTS

Figure 1:
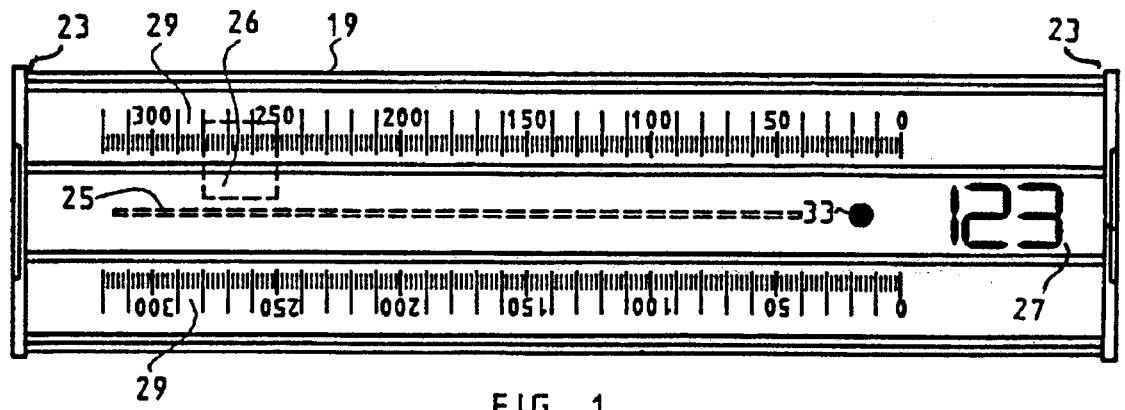
FIG. 1 is a schematic, longitudinal view of an inventive measuring scale including a row of photoelements and a microprocessor.
Figure 2:
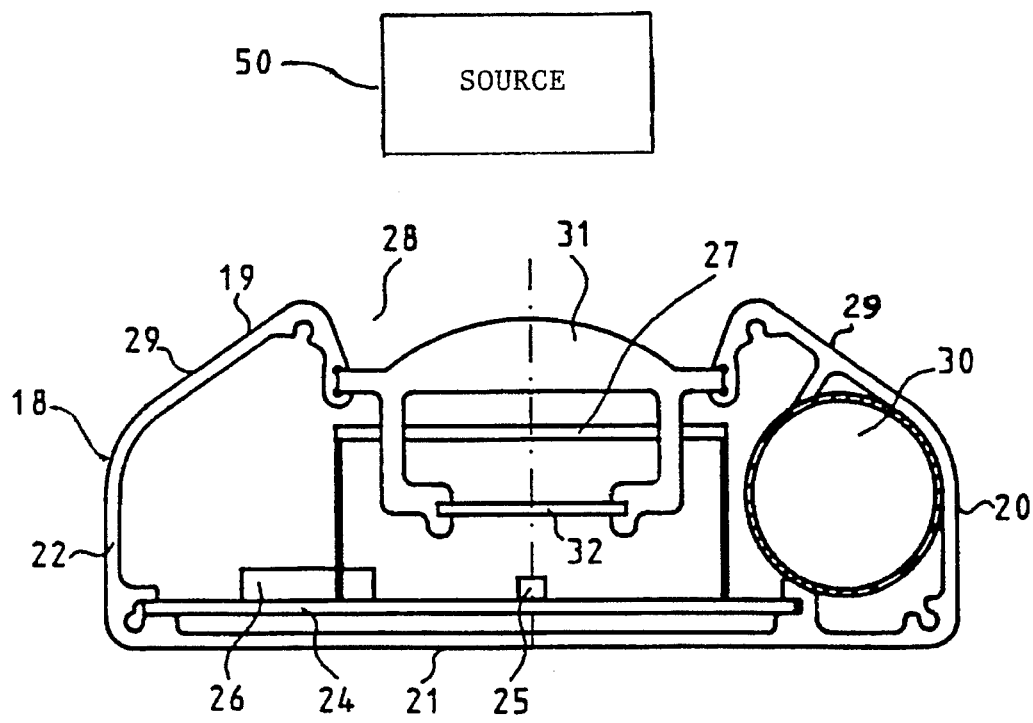
FIG. 2 is a cross-sectional view of the measuring scale shown in FIG. 1.

The inventive measuring scale has the form of an optoelectronic detector unit. It comprises an elongated profiled body 19 which is enclosed by walls 20, 21, 22 on three sides thereof. A fourth side, the upper side, is provided with an elongated opening 28. The imperforate surfaces along the sides of the opening 28 are provided with a linear metric graduation 29 whose length is greater than 30 cm. Each end of the body 19 is closed with an end-plate 23.

The body 19 is mounted on a circuit board 24 on which a number of known electronic components are mounted. Since these components have no actual bearing on the invention, they will not be described here. Also mounted on the circuit board 24 is a long row of discrete photoelements 25, preferably phototransistors. These photoelements are connected conductively to a microprocessor 26, a so-called microchip processor, which is attached to the circuit board 24 and which detects the intensity of the light emitted by each individual photo-element 25 and, on the basis thereof, calculates the center of gravity point of a-light beam incident on the measuring scale 18. This results in output currents which cause the result to be shown in numeric form on a display unit 27 connected indirectly to the circuit board 24, in a known manner.

The measuring scale components are powered electrically by a number of batteries 30 mounted in the body 19. The microprocessor 26 is also intended to activate an indicator lamp 33 when incident light on the measuring scale 18 activates the microprocessor 26 so as to calculate the aforesaid center of gravity position. The indicator lamp 33 is placed within the body 19 of the measuring scale so that it can be seen easily by the person carrying out the measurements.

Arranged in the opening 28 on the upper side of the body 19 is an elongated lens 31 which enlarges the detector surface of the measuring scale 18 so as to capture any movements made by a beam or radiation source 50. The lens 31 has a low position in the opening 28, thereby protecting the lens 31 and shielding said lens from oblique incident light that may have an undue negative influence on the photoelements 25.

As before mentioned, the inventive measuring scale is intended for use together with a beam source, for instance a laser projector. A laser projector produces coherent light which has only a small beam divergence. This means that the light will have high intensity on a very small irradiated surface. In the case of the inventive measuring scale, the intensity distribution is achieved so that light from the beam source is able to illuminate a plurality of mutually adjacent photoelements 24 in the measuring scale 18. This is effected by mounting beneath the lens 31 in the body 19 a diffusor 32 which functions to distribute incident light in the measuring scale 18 to the respective photoelements 25.

Figure 3A:
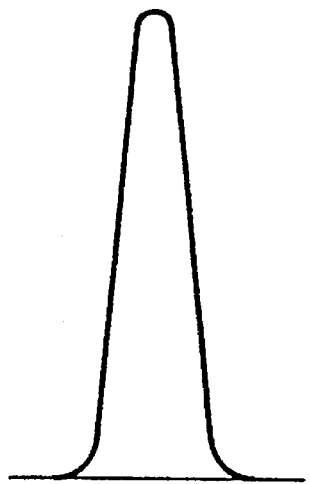
FIGS. 3(a), 3(b), and 3(c) illustrates the detection principles of the measuring scale.
Figure 3B:
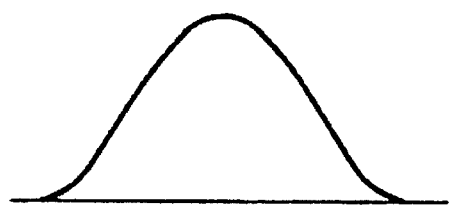
Figure 3C:
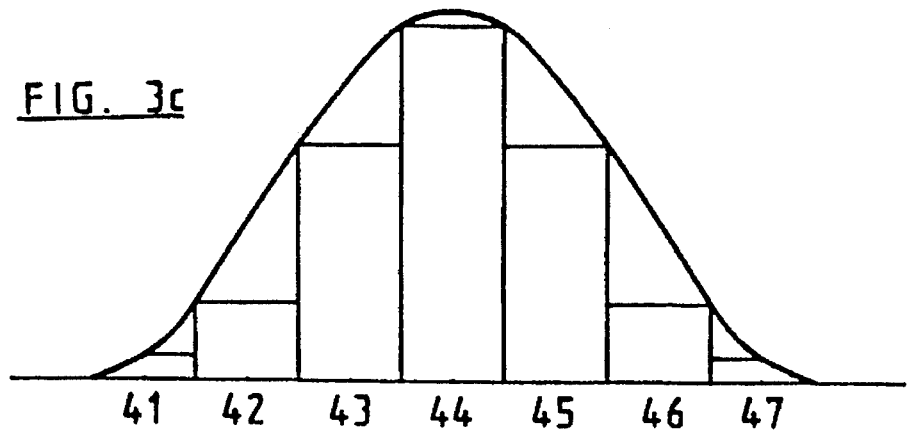

FIG. 3a illustrates an intensity curve of a laser beam emitted from a laser projector. FIG. 3b illustrates an intensity distribution curve having the same radiation quantity, and FIG. 3c shows the same curve on a larger scale. The curve in FIG. 3c illustrates the light intensity emitted by a number of mutually adjacent photo-elements 41–47 in the measuring scale 18 and detected by the microprocessor 26. The microprocessor 26 determines the precise position of the light beam on the measuring scale 18, by calculating the center-of-gravity of the broadened curve and displays this precise position in a so-called window on the display unit 27.

It will be understood that the invention is not restricted to the exemplified embodiments thereof and that these embodiments can be modified within the scope of the following claims. For instance, the light detecting. elements used in the measuring scale may be photodiodes. Furthermore, the measuring result may be reproduced in away other than that described in the specification.

I claim:

1. An optoelectronic measuring scale for determining and for indicating position of light incident on the measuring sale and emitted from a radiation source, and comprising a composite unit which includes a section-profiled body (19), a row of discrete photoelements (25) which are fixedly mounted on a circuit board (24) in said body (19) and which are connected to a microprocessor (26) attached to the circuit board (24); a diffusor (32) mounted in the measuring scale for distributing light intensity such that incident light on the measuring scale is distributed over a plurality of mutually adjacent photoelements (25) for detecting light incident thereto; and wherein said microprocessor (26) is adapted to detect and compare intensity of light detected by respective photoelements (25), calculate a center-of-gravity of a broadened intensity curve of said light intensity based upon said detection and comparison of said light intensity and produce output currents for causing an exact position of the light beam on the measuring scale to be indicated on a display (27) connected to the measuring scale.

2. An optoelectronic measuring scale according to Claim 1, wherein the light detecting photoelements (25) comprise phototransistors.

3. An optoelectronic measuring scale according to Claim 2, and further comprising an elongated lens (31) mounted in an opening (28) on an upper side of the measuring scale, for enlarging the detector.

4. An optoelectronic measuring scale according to Claim 1, and further comprising an elongated lens (31) mounted in an opening (28) on an upper side of the measuring scale for enlarging the detector surface of the measuring scale and therewith capture possible movements of the beam source.

* * * * *

UNITED STATES PATENT AND TRADEMARK OFFICE
CERTIFICATE OF CORRECTION

PATENT NO. : 5,453,839
DATED : September 26, 1995
INVENTOR(S) : Jonas SAMUELSSON It is certified that error appears in the above-indentified patent and that said Letters Patent is hereby corrected as shown below:

Claim 3, Col. 4, line 22, after "detector" insert --surface of the measuring scale and therewith capture possible movements of the beam source--

Signed and Sealed this

Sixteenth Day of April, 1996

Attest:

BRUCE LEHMAN

*Attesting Officer*  *Commissioner of Patents and Trademarks*